United States Patent [19]
Huygens

[11] Patent Number: 6,037,382
[45] Date of Patent: Mar. 14, 2000

[54] PROCESS FOR PREPARING A FLEXIBLE POLYURETHANE FOAM

[75] Inventor: Eric Huygens, Heverlee, Belgium

[73] Assignee: Imperial Chemical Industries PLC, London, United Kingdom

[21] Appl. No.: 09/040,073

[22] Filed: Mar. 17, 1998

[30] Foreign Application Priority Data

Mar. 25, 1997 [EP] European Pat. Off. ............. 97200886

[51] Int. Cl.[7] .................................................. C08G 18/30
[52] U.S. Cl. .......................... 521/134; 521/159; 521/160; 521/174; 521/914
[58] Field of Search .................................... 521/159, 160, 521/174, 134, 914

[56] References Cited

U.S. PATENT DOCUMENTS

| | | | |
|---|---|---|---|
| 4,374,209 | 2/1983 | Rowlands | 521/116 |
| 5,063,253 | 11/1991 | Gansen et al. | 521/159 |
| 5,132,334 | 7/1992 | Gansen et al. | 521/160 |
| 5,436,277 | 7/1995 | Narayan et al. | 521/160 |
| 5,773,483 | 6/1998 | Eling et al. | 521/125 |

FOREIGN PATENT DOCUMENTS 2037082  9/1991  Canada.

*Primary Examiner*—Rachel Gorr
*Attorney, Agent, or Firm*—Pillsbury Madison & Sutro Intellectual Property Group

[57] ABSTRACT

Process for making flexible polyurethane foams using MDI and TDI and a polyol composition comprising dispersed particulate material.

8 Claims, No Drawings

PROCESS FOR PREPARING A FLEXIBLE POLYURETHANE FOAM

The present invention is concerned with a process for preparing flexible polyurethane foams.

It is widely known to prepare flexible polyurethane foams by reacting an organic polyisocyanate and a high molecular weight isocyanate-reactive compound in the presence of a blowing agent. More in particular it has been disclosed in EP-111121 to prepare flexible polyurethane foams from a polyisocyanate composition comprising a semi-prepolymer. The polyisocyanate composition is prepared by reacting a diphenylmethane diisocyanate and a polyol; a polymethylene polyphenylene polyisocyanate (polymeric MDI) is used as well.

In EP-392788 flexible foams are prepared by reacting semi-prepolymers or prepolymers with an isocyanate-reactive composition containing a high amount of water.

In EP-296449 flexible foams are prepared by reacting polyisocyanates, polyols and water at a relatively low NCO-index.

Copending application PCT/EP95/02068 is concerned with a process for making flexible foams using a semi-prepolymer which has been made by reacting a portion of polymeric MDI with a polyol and adding the other part to the reaction product so obtained.

Although useful flexible foams based on MDI and polymeric MDI and polymeric MDI are obtainable, room for improvement exists. In particular foams made in a closed mould which foams are to be used as cushioning material in automotive seating could be improved as to foam strength, resilience particularly at low density of the foam.

In the past some of these improvements have been obtained by using tolylene diisocyanate (TDI) instead of MDI. In particular such foams show a high resilience, good foam strength at low density.

However, due to its vapour pressure and toxicity special measures need to be taken to handle TDI. Further TDI based foams show relatively poor hardness especially at low density and a slow cure and narrow processing range (isocyanate index).

More recently, proposals have been made to avoid the disadvantages of both MDI-based and TDI-based foams by using combinations of MDI and TDI.

In EP-439792 the use of a polyisocyanate has been proposed which comprises 21–95% by weight of TDI in order to improve the tensile strength; the amount of TDI used still is relatively high.

In EP-679671 the use of a mixture of polymeric MDI and TDI comprising 3–20% by weight of TDI has been proposed to prepare a low density foam having an enhanced impact resilience, improved compression set and an excellent ability to reduce 6 Hz vibration transmissibility. The polymeric MDI used has a high three benzene ring compound content compared to the four or more benzene ring compound content+less active ingredient. The use of polymer polyols has been proposed in very general terms.

In EP-694570 the use of a polyisocyanate prepolymer has been proposed comprising MDI, polymeric MDI and 5–15% by weight of TDI. The polyisocyanate prepolymer has improved flowability; the foams made thereof show improved ILD, compression set and flammability characteristics. The use of a graft polymer dispersion in a polyol has been proposed as well.

In co-pending application PCT/EP96/04392 it has been proposed to use an MDI prepolymer and TDI to improve resilience and foam stability, comfort properties and mechanical strength. The amount of TDI may be 2–25% by weight of the polyisocyanate composition, which has an MDI+TDI functionality of 2.05–2.35. The use of polymer polyol prepared by the in situ polymerisation of styrene and/or acrylonitrile in polymeric polyols or by the in situ reaction between a polyisocyanate and triethanolamine in a polymeric polyol (PIPA polyol) has been proposed in general terms. The polymeric polyol may contain 5–50% by weight of dispersed polymer.

Surprisingly it was found that by using a polyisocyanate composition of MDI and TDI which composition has a limited content of polyisocyanates having an isocyanate functionality of 3 or more and a limited functionality and TDI content, together with a polyol composition comprising a limited amount of a PIPA polyol a low density flexible moulded foam may be obtained which shows a high resilience, fast cure, short demould times, and good load-bearing properties, tear strength, elongation, comfort and durability properties.

Therefore the present invention is concerned with a process for preparing a flexible polyurethane foam by reacting at an NCO index of 70–120 a) a polyisocyanate composition comprising per 100 parts by weight of the composition 5 to 20 parts by weight of tolylene diisocyanate and 80–95 parts by weight of diphenylmethane diisocyanate and homologues thereof having an isocyanate functionality of 3 or more, the amount of diphenylmethane diisocyanate being 70 to 95% by weight calculated on the amount of diphenylmethane diisocyanates and homologues, and the diphenylmethane diisocyanate comprising 8–45% by weight, calculated on the weight of this diphenylmethane diisocyanate, of diphenylmethane diisocyanate containing at least one NCO group in the ortho position, and wherein preferably the weight ratio of homologues having 3 NCO groups over homologues having 4 or more NCO groups+by-products is less than 1.0; and b) a polyol composition comprising
1) a polyoxyethylene-polyoxypropylene-polyol, having an average nominal hydroxyl functionality of 2–6 and preferably of 2–4 and most preferably of 3 and an average equivalent weight of 1000–4000 and containing 5–25% by weight of oxyethylene groups which preferably are at the end of the polymer chains;
2) 2 to 7 parts by weight of water;
3) 2 to 10 parts by weight of a polyether polyol having an average nominal hydroxyl functionality of 2–6, an average equivalent weight of 200–1500 and containing at least 60% by weight of oxyethylene groups;
4) 1 to 15 parts by weight of particulate material which is the reaction product of a polyisocyanate and a compound having a plurality of hydroxyl-, primary amine- and/or secondary amine groups and having an equivalent weight of up to 400 and which material is dispersed in said polyol composition; the amounts of b2) to b4) being calculated per 100 parts by weight of b1); and
5) optionally auxiliaries and additives known per se.

Further the present invention is concerned with a reaction system comprising the above polyisocyanate composition and polyol composition and with said polyisocyanate and polyol composition.

In the context of the present application the following terms have the following meaning:

1) isocyanate index or NCO index or index: the ratio of NCO-groups over isocyanate-reactive hydrogen atoms present in a formulation, given as a percentage:

$$\frac{[NCO] \times 100}{[active\ hydrogen]} (\%)$$

In other words the NCO-index expresses the percentage of isocyanate actually used in a formulation with respect to the amount of isocyanate theoretically required for reacting with the amount of isocyanate-reactive hydrogen used in a formulation.

It should be observed that the isocyanate index as used herein is considered from the point of view of the actual foaming process involving the isocyanate ingredient and the isocyanate-reactive ingredients. Any isocyanate groups consumed in a preliminary step to produce the semi-prepolymer or other modified polyisocyanates or any active hydrogens reacted with isocyanate to produce modified polyols or polyamines, are not taken into account in the calculation of the isocyanate index. Only the free isocyanate groups and the free isocyanate-reactive hydrogens (including those of the water) present at the actual foaming stage are taken into account.

2) The expression "isocyanate-reactive hydrogen atoms" as used herein for the purpose of calculating the isocyanate index refers to the total of hydroxyl and amine hydrogen atoms present in the reactive compositions in the form of polyols, polyamines and/or water; this means that for the purpose of calculating the isocyanate index at the actual foaming process one hydroxyl group is considered to comprise one reactive hydrogen and one water molecule is considered to comprise two active hydrogens.

3) Reaction system: a combination of components wherein the polyisocyanate component is kept in a container separate from the isocyanate-reactive components.

4) The expression "polyurethane foam" as used herein generally refers to cellular products as obtained by reacting polyisocyanates with isocyanate-reactive hydrogen containing compounds, using foaming agents, and in particular includes cellular products obtained with water as reactive foaming agent (involving a reaction of water with isocyanate groups yielding urea linkages and carbon dioxide and producing polyurea-urethane foams).

5) The term "average nominal hydroxyl functionality" is used herein to indicate the number average functionality (number of hydroxyl groups per molecule) of the polyol composition on the assumption that this is the number average functionality (number of active hydrogen atoms per molecule) of the initiator(s) used in their preparation although in practice it will often be somewhat less because of some terminal unsaturation. The term "equivalent weight" refers to the molecular weight per isocyanate reactive hydrogen atom in the molecule.

6) The word "average" refers to number average.

The diphenylmethane diisocyanate (MDI) used may be selected from isomeric mixtures of 4,4'-MDI and 2,4'-MDI and less than 10% by weight of 2,2'-MDI and modified variants thereof containing carbodiimide, uretonimine, isocyanurate, urethane, allophanate, urea or biuret groups.

Preferred are isomeric mixtures with 2,4'-MDI, and uretonimine and/or carbodiimide modified MDI having an NCO content of at least 25% by weight and urethane modified MDI obtained by reacting excess MDI and polyol having a molecular weight of at most 1000 and having an NCO content of at least 25% by weight. Most preferred is an isomeric mixture comprising 5–45% by weight of 2,4'-MDI and less than 5% by weight of 2,2'-MDI the remainder being 4,4'-MDI.

The homologues having an isocyanate functionality of 3 or more are contained in so-called polymeric or crude MDI.

Polymeric or crude MDI comprise MDI and homologues having an isocyanate functionality of 3 or more and are well known in the art. They are made by the phosgenation of a mixture of polyamines obtained by the acid condensation of aniline and formaldehyde.

The manufacture of both the polyamine mixtures and the polyisocyanate mixtures is well known. The condensation of aniline with formaldehyde in the presence of strong acids such as hydrochloric acid gives a reaction product containing diaminodiphenylmethane together with polymethylene polyphenylene polyamines of higher functionality, the precise composition depending in known manner inter alia on the aniline/formaldehyde ratio. The polyisocyanates are made by phosgenation of the polyamine mixtures and the various proportions of diamines, triamines and higher polyamines give rise to related proportions of diisocyanates, triisocyanates and higher polyisocyanates. The relative proportions of diisocyanate, triisocyanate and higher polyisocyanates in such crude or polymeric MDI compositions determine the average functionality of the compositions, that is the average number of isocyanate groups per molecule. By varying the proportions of starting materials, the average functionality of the polyisocyanate compositions can be varied from little more than 2 to 3or even higher. In practice, however, the average isocyanate functionality preferably ranges from 2.3–2.8. The NCO value of these polymeric or crude MDIs is at least 30% by weight. The polymeric or crude MDI contain diphenylmethane diisocyanate, the remainder being polymethylene polyphenylene polyisocyanates of functionality greater than two together with by-products formed in the manufacture of such polyisocyanates by phosgenation.

It is to be noted that the polymeric or crude MDI may contain 2,4'-MDI and 2,2'-MDI and that the range of ortho NCO substituted MDI in the diphenylmethane diisocyanate in polyisocyanate composition a) is the totality of the 2,2'- and 2,4'-MDI in the MDI and in the polymeric or crude MDI.

The ratio of the homologues having 3 NCO groups over the homologues having 4 or more NCO groups+the by-products preferably is less than 1.0. Crude or polymeric MDIs having such ratio are commercially available; e.g. Suprasec DNR from Imperial Chemical Industries PLC.

The tolylene diisocyanate used is known as such and may be selected from all isomers and mixtures thereof and in particular from 2,4- and 2,6-tolylene diisocyanate and mixtures thereof, like the commercially sold TDI 80/20 and TDI 65/35.

The total amount of polymeric or crude MDI used to prepare the polyisocyanate composition should be such that the amount of diphenylmethane diisocyanate and the amount of ortho-substituted diisocyanate remains within the ranges given above. Those skilled in the art will be able to calculate the amount easily depending on the chosen MDI and the polymeric or crude MDI, certainly in the light of the examples.

The polyisocyanate composition a) is made by simple mixing of the MDI, the TDI and the crude or polymeric MDI in any order.

Polyether polyols b1) which may be used include products obtained by the polymerisation of ethylene oxide and propylene oxide in the presence, where necessary, of polyfunctional initiators. Suitable initiator compounds contain a plurality of active hydrogen atoms and include water, butanediol, ethylene glycol, propylene glycol, diethylene glycol, triethylene glycol, dipropylene glycol, ethanolamine, diethanolamine, triethanolamine, toluene diamine, diethyl toluene diamine, cyclohexane diamine, cyclohexane dimethanol, glycerol, trimethylolpropane and 1,2,6-hexanetriol. Mixtures of initiators and/or cyclic oxides may be used.

The polyoxyethylene-polyoxypropylene polyols are obtained by the simultaneous or sequential addition of ethylene and propylene oxides to initiators as fully described in the prior art. Random copolymers, block copolymers and combinations thereof may be used having the indicated amount of oxyethylene groups in particular those having at least part and preferably all of the oxyethylene groups at the end of the polymer chain (capped or tipped). Mixtures of the said polyols can be particularly useful.

Most preferred are polyoxyethylene polyoxypropylene polyols having an average nominal functionality of 2–4 and most preferably of 3 and an oxyethylene content of 5–25% by weight, preferably having the oxyethylene groups at the end of the polymer chains.

During the last years several methods have been described to prepare polyether polyols having a low level of unsaturation. These developments have made it possible to use polyether polyols at the higher end of the molecular weight range since much polyols can now be prepared with an acceptably low level of unsaturation. According to the present invention polyols having a low level of unsaturation may be used as well. In particular such high molecular weight polyols having a low level of unsaturation may be used for preparing flexible foams having a high ball rebound.

The polyols b3) used in polyol composition b) may be selected from the polyether polyol mentioned for b1) with the proviso that the equivalent weight is 200–1500 and the oxyethylene content is at least 60% by weight. Most preferred polyols are 1) polyoxyethylene polyoxypropylene polyols having an oxyethylene content of 60–95% by weight wherein the oxyethylene groups are randomly distributed in the polymer chains, an average equivalent weight of 1000–1500 and an average nominal hydroxyl functionality of 2–4 and 2) polyoxyethylene polyols having an equivalent weight of 200–500.

The particulate material b4) which is the reaction product of a compound having a plurality of hydroxyl-, primary amine- and/or secondary amine groups and having an equivalent weight of up to 400 and preferably of up to 200 (hereinafter called coreactant) and a polyisocyanate and which is dispersed in a polyol is generally known as such in the art, like e.g. a PIPA polyol. Such PIPA polyols have been described in the prior art extensively: see e.g. GB2072204, U.S. Pat. No. 4,452,923, EP-418039 and WO94/12533. Such PIPA polyols are commercially available: e.g. Daltocel ™ XF 417 from Imperial Chemical Industries PLC. The particulate material which is the reaction product of a polyisocyanate and the coreactant may be prepared in ways described in the above prior art.

Usually the particulate material is prepared in polyol b1) by adding the coreactant to polyol b1) followed by the addition of the polyisocyanate. The amount of coreactant and polyisocyanate depends on the desired amount of particulate material dispersed in the polyol. If desired, loadings of the dispersed material higher than those specified hereinbefore may be made followed by dilution with polyol b1) to the desired amount.

When desired, special addition schemes of the coreactant and the polyisocyanate may be employed as disclosed in EP-418039 and WO94/125333. The relative amount of coreactant and polyisocyanate is generally chosen in such a way that the number of hydrogen atoms in the coreactant capable of reacting with the polyisocyanate exceeds the number of isocyanate groups.

The polyisocyanate used in making the particulate material is any organic compound having at least two, preferably 2 to 4 isocyanate groups per molecule. The polyisocyanate may be aliphatic, aromatic or cycloaliphatic, although aromatic types are preferred due to their desirable properties and reactivity. Representative of these types are diisocyanates such as m- or p-phenyl diisocyanate, toluene-2,4-diisocyanate, toluene-2,6-diisocyanate, hexamethylene-1,6-diisocyanate, tetramethylene-1,4-diisocyanate, cyclohexane-1,4, diisocyanate, hexahydrotoluene diisocyanate (and isomers), naphtylene-1,5,-diisocyanate, 1-methylphenyl-2,4-phenyldiisocyanate, diphenylmethane-4,4'-diisocyanate, di-phenylmethane-2,4'-diisocyanate,4,4'-biphenylenediisocyanate, 3,3'-dimethoxy-4,4'-biphenylenediisocyanate and 3,3'-dimethyldiphenylpropane-4.4'-diisocyanate; triisocyanates such as toluene-2,4,6-triisocyanate and tetraisocyanates such as 4,4'-dimethyldiphenylmethane-2,2', 5,5'-tetraisocyanate, and other polyisocyanates such as the diverse polymethylene-polyphenylpolyisocyanates (polymeric or crude MDI).

The coreactant is a material having a plurality of —OH, >NH and/or —NH$_2$ groups and an equivalent weight per active hydrogen atom of up to 400, preferably up to 200. Since the coreactant reacts with the polyisocyanate in situ in the polyol, it is also preferred that the coreactant be more reactive with the polyisocyanate than the polyol. Preferred coreactants are alkanolamines, low equivalent weight amine-initiated polyether polyols, alkylene oxide, acrylonitrile, or acrylic ester adducts of amines, primary amines, secondary amines, hydrazines, dihydrazides, urea, ammonia, Mannich condensates, low equivalent weight hydroxyl-terminated compounds such as ethylene glycol, glycerine, glycol ethers, pentaerythritol, aminobenzenes, or mixtures thereof. Of these, the alkanolamines are most preferred.

Suitable alkanolamines include mon-, di- and trialkanolamines, particularly those wherein the alkanol groups have from 2 to 6, preferably 2 to 3 carbon atoms. The mono- and dialkanolamines may also have a single N-alkyl substituent, preferably having from 1 to 6 carbon atoms. Preferred among these are monethanolamine, diethanolamine, triethanolamine, N-methylethanolamine, N-ethylethanolamine, N-butyl-ethanolamine, N-methyldiethanolamine, diisopropanolamine, triisopropanolamine, N-methylisopropanolamine, N-ethylisopropanolamine, and N-propylisopropanolamine.

Suitable primary and/or secondary amines include polyhydric aliphatic, arylaliphatic, cycloaliphatic and aromatic amines including, for example, ethylene diamine, 1,2- and 1,3-propylene diamine, tetramethylene diamine, hexamethylene diamine, dodecamethylene diamine, trimethyldiaminohexane. N,N'-dimethylethylenediamine, higher homologues of ethylene diamine such as diethylene triamine, triethylenetetramine and tetraethylenepentamine, homologues of propylene diamine, 4-aminobenzylamine, 4-aminophenylethylamine, piperazine, N,N'-bisaminoethyldipropylene triamine, and 1-amino-3,3,5-trimethyl-5-aminomethylcyclohexane.

Suitable hydrazines include hydrazine itself and mono-substituted or N,N'-disubstitued hydrazines having substituent groups such as $C_1$–$C_6$ alkyl, cyclohexyl or phenyl groups. Hydrazine itself is preferred among these.

Suitable hydrazides include the hydrazides of multifunctional carboxylic acids such as carbonic acid, oxalic acid, malonic acid, succinic acid, adipic acid, sebacic acid, azelaic acid, maleic acid, fumaric acid, phthalic acid, isophthalic acid and terephthalic acid, and the esters of a hydrazine monocarboxylic acid with dihydric or polyhydric alcohols and phenols. These hydrazides preferably have a molecular weight of from 90 to 1000.

The reactants are advantageously mixed at any temperature at which the mixture is a liquid and at which the reactants do not degrade, but are preferably mixed at 0 to 170° C., more preferably 15 to 70° C. The isocyanate and coreactant are advantageously mixed with stirring, in order to promote the formation of a plurality of small particles. Usually, rapid agitation is desired to optimize particle size and minimize the viscosity of the resulting dispersion. The process can be conducted batch-wise or continuously, as described in U.S. Pat. No. 4,374,209.

The reaction between the polyisocyanate and the coreactant is often exothermic, and proceeds rapidly, being essentially completed in most cases in 1 minute to 3 hours, preferably 1 to 30 minutes, although this depends somewhat on the choice of polyisocyanate and coreactant, the batch size and initial temperature. Agitation is preferably effected throughout the reaction period.

If desired, a catalyst for the reaction between the polyisocyanate and the coreactant may be used to accelerate the reaction. Suitable catalysts include these described below with respect to the use of this dispersion to prepare polyurethanes, with the organotin catalysts being preferred. The amount of catalyst is advantageously up to 1 weight percent based on polyol, preferably up to 0.1 weight percent and more preferably up to 0.05 weight percent. However, the catalyst may not be necessary, particularly with the more reactive coreactants.

Once the polyol with the dispersed particulate material has been prepared the polyol composition b) is prepared by adding the water and polyol b3) and mixing.

To this polyol composition b) additives and auxiliaries known per se may be added, like catalysts which enhance the formation of urethane and urea bonds (e.g. tertiary amine and organo tin catalysts), chain extenders and cross-linkers having an equivalent weight of 31 to less than 200 and having 2–8 isocyanate-reactive hydrogen atoms (e.g. ethanolamine, diethanolamine, triethanolamine, ethylene glycol, diethylene glycol, triethylene glycol, propylene glycol, dipropylene glycol, butanediol, glycerol, trimethylolpropane, pentaerythritol, sorbitol, sucrose, polyethylene glycol having a molecular weight less than 400, toluene diamine, diethyl toluene diamine, cyclohexane diamine, phenylene diamine, diphenylmethane diamine, alkylated diphenylmethane diamine and ethylene diamine), surfactants, stabilizers, flame retardants, fillers, anti-oxidants, anti-microbial agents, colorants and other blowing agents than water (e.g. gaseous or liquid $CO_2$ supplied under pressure via the polyisocyanate or polyol composition).

The foams are made by combining and mixing the polyisocyanate and polyol compositions a) and b) and allowing the mixture to react. The relative amounts will depend on the desired index which may vary from 70–120 and can be easily calculated by those skilled in the art from a selected polyisocyanate and polyol composition. A further advantage of the use of the polyisocyanate composition a) and the polyol composition b) is that in order to operate at an index of 70–120 the relative amounts of the compositions do not differ too much, which allows for easy metering and mixing of the compositions.

The process may be used to make continuous or discontinuous slab-stock flexible foams, moulded flexible foam made in an open or closed mould including the so-called foam-in-fabric and pour-in-place applications.

The flexible foams prepared according to the present invention may have a free rise density of 20–60 kg/m$^3$ (ISO 845) and may be used in mattresses, cushions, furniture seating and automotive seating.

The process according to the present invention may be conducted according to the one-shot process, the prepolymer process or the semi- or quasi prepolymer process. In the prepolymer and semi- or quasi-prepolymer process all or part of the polyols used in the polyol composition are prereacted with an excessive amount of the polyisocyanate before the reaction of the polyisocyanate and the water takes place, i.e. the foaming. If the prepolymer or semi- or quasi prepolymer process is used, preferably only all or part of polyol b1) is prereacted. It is to be noted that any prereacted polyol is not taken into consideration in calculating the amount of the ingredients in the polyisocyanate composition and is to be taken into account for calculating the amounts of the ingredients in the polyol composition.

The present invention is also concerned with such prepolymer and semi-prepolymer compositions. Preferably such compositions have a free NCO content of 8–38 and preferably of 12–26% by weight, they contain the polyisocyanate composition a) described before, part of said polyisocyanate composition being present in the form of a urethane containing adduct with polyol b1), the amount of this adduct preferably being 30–60% by weight of the polyisocyanate composition.

Such prepolymer or semi-prepolymer composition according to the present invention is preferably prepared by reacting an excessive amount of diphenylmethane diisocyanate (MDI) and optionally polymeric or crude MDI (which comprises MDI and homologues thereof having an isocyanate functionality of 3 or more) with the polyol and adding to this reaction product the tolylene diisocyanate (TDI) and optionally MDI and/or polymeric or crude MDI. The polymeric or crude MDI may be added to the MDI which is to be used for the reaction with the polyol, the polymeric or crude MDI may be added to the reaction product of the MDI and the polyol or part of the polymeric or crude MDI may be added to the MDI which is to be reacted with the polyol while the other part is added to the reaction products so obtained.

The reaction to prepare the prepolymer, between the MDI (and optionally the polymeric or crude MDI) and the polyol is conducted in known manner by mixing the ingredients and allowing them to react. Preferably the reaction is conducted at 60–100° C. until no change in NCO value is observable anymore. Usually the reaction will be complete in 1–4 hours. A catalyst enhancing the formation of urethane groups may be used, if desired, but is not necessary.

Sometimes the polyols used still contain small amounts of catalysts, or residues thereof, which have been used to prepare such polyols; the presence of these catalysts or residues might have a detrimental effect upon the reaction of the MDI and the polyol; in order to obviate this an acid or acid halide, like benzoyl chloride, toluene sulfonylchloride or thionyl chloride, may be added in a low amount (generally less than 1000 ppm) to the ingredients. After completion the reaction product is mixed with the TDI and optionally with further MDI, polymeric MDI and/or crude MDI.

EXAMPLES 1 AND 2

A prepolymer was prepared by 1) mixing 43.0 parts by weight of diphenylmethane diisocyanate containing 78.6% by weight of 4,4'-diphenylmethane diisocyanate and 21.4% by weight of 2,4'-diphenylmethane diisocyanate and 11.0 parts by weight of a polymethylene polyphenylene polyisocyanate having an NCO value of 30.7% by weight and a number average isocyanate functionality of 2.7 (Suprasec 2185, Suprasec is a trademark of ICI), 2) adding to this mixture 38.0 parts by weight of a polyoxyethylene polyoxypropylene polyol having a nominal functionality of 3, a number average molecular weight of 6000 and an oxyethylene content of 15% by weight (all tip) followed by mixing and 3) allowing the mixture to react 4 hours at 85° C. After reaction the prepolymer is mixed with 8 parts of the polymethylene polyphenylene polyisocyanate mentioned above.

Isocyanate A is prepared by mixing 90.1 parts of this prepolymer mixture with 9.9 parts of TDI for 15 minutes.

Isocyanate B is prepared by mixing 86.6 parts of this prepolymer mixture with 13.4 parts of TDI for 15 minutes.

An isocyanate reactive composition was prepared by mixing polyols, water, catalysts and surfactant in amounts in part by weight given in the table.

A moulded flexible foam was prepared by allowing the isocyanates A and B to react with the isocyanate reactive composition in a mould (mould temperature 65° C. and size 21.4 l, machine: Krauss Maffei Komet 40/20).

|  | Example 1 | Example 2 |
|---|---|---|
| Isocyanate A | 58.61 | / |
| Isocyanate B | / | 49.99 |
| Polyol A | 15.02 | / |
| Polyol B | 20.00 | 21.07 |
| Polyol C | 3.02 | 2.74 |
| Polyol D | / | 22.68 |
| Dabco 331v | 0.30 | 0.24 |
| Niax Al | 0.15 | 0.12 |
| B 4113 | 0.60 | 0.63 |
| water | 2.30 | 2.53 |
| NCO index | 100 | 87 |

| Recalculation of these mixtures gives: | | Example 1 | Example 2 |
|---|---|---|---|
| Polyisocyanate composition | | | |
| TDI (parts by weight) | | 15 | 20 |
| MDI mixture (parts by weight) (without polyol) | | 85 | 80 |
| diisocyanate in MDI mixture | (% w) |  | 80.9 |
| ortho in MDI diisocyanate | (% w) |  | 15.5 |
| 4, 4'-MDI in MDI mixture | (% w) |  | 65.4 |
| triisocyanate in MDI mixture | (% w) |  | 8.2 |
| higher oligomers in MDI mixture | (% w) |  | 10.9 |

-continued

| Recalculation of these mixtures gives: | | | |
|---|---|---|---|
|  |  | Example 1 | Example 2 |
| ratio f = 3/f≧4 | (% w) |  | 0.75 |
| polymer adduct on total polyisocyanate | (% w) | 38.6 | 37.1 |
| NCO value of polyisocyanate composition | (% w) | 22.3 | 23.4 |
| Polyol composition | | | |
| parts by weight (pbw) water per 100 pbw polyol b1 | | 4.5 | 4.5 |
| pbw polyether polyol b3 per 100 pbw polyol b1 | | 5.9 | 4.9 |
| pbw particulate material per 100 pbw polyol b1 | | 7.8 | 7.5 |

Polyol A: a 6000 MW polyoxyethylene/polyoxypropylene triol with 15% w EO tip; OH number=28 mg KOH/g.

Polyol B: a PIPA polyol; Daltocel XF 417 ex ICI; contains 20% w of dispersed particulate material.

Polyol C: a 4000 MW polyoxyethylene/polyoxypropylene triol with 75% w EO randomly distributed; OH number=42 mg KOH/g.

Polyol D: a 4700 MW polyoxyethylene/polyoxyproplene triol with 14.2% w EO tip; OH number=36 mg KOH/g.

Dabco 331v: amine catalyst supplied by Air Products.

Niax A1: amine catalyst supplied by Osi specialities.

B 4113: a silicone surfactant supplied by Th. Goldschmidt AG.

After demoulding (5 min) a foam was obtained having the properties as described in the table underneath:

| Example |  |  | 1 | 2 |
|---|---|---|---|---|
| Overall density | kg/m$^3$ | ISO 845 | 39 | 34 |
| ILD 25% | kg | ISO 2439 | 19 | 10.3 |
| Ball rebound | % | ISO 4707 | 60 | 65 |
| Angle Tear | kg/cm$^2$ | DIN 53515 | 0.55 | 0.48 |
| Elongation | % | ISO 1798 | 103 | 100 |
| Comp. Set | | | | |
| dry 50% (thickness) | % | ISO 1856 | 4.4 | 3.8 |
| dry 75% (thickness) | % | ISO 1856 | — | 4.5 |
| wet 50% (thickness) | % | ISO 1856 | — | 7.4 |

I claim:

1. A process for preparing a flexible polyurethane foam at an NCO index of 70–120 by reacting a) a polyisocyanate composition comprising per 100 parts by weight of the composition 5 to 20 parts by weight of tolylene diisocyanate and 80–95 parts by weight of diphenylmethane diisocyanate and homologues thereof having an isocyanate functionality of 3 or more, the amount of diphenylmethane diisocyanate being 70 to 95% by weight calculated on the amount of diphenylmethane diisocyanates and homologues, and the diphenylmethane diisocyanate comprising 8–45% by weight, calculated on the weight of this diphenylmethane diisocyanate, of diphenylmethane diisocyanate containing at least one NCO group in the ortho position, b) a polyol composition comprising 1) a polyoxyethylene-polyoxypropylene-polyol, having an average nominal hydroxyl functionality of 2–6, an average equivalent weight of 1000–4000 and containing 5–25% by weight of oxyethyelene groups;

2) 2 to 7 parts by weight of water;

3) 2 to 10 parts by weight of a polyether polyol having an average nominal hydroxyl functionality of 2–6, an average equivalent weight of 200–1500 and containing at least 60% by weight of oxyethylene groups;

4) 1 to 15 parts by weight of particulate material which is the reaction product of a polyisocyanate and a compound having a plurality of hydroxyl-, primary amine- and/or secondary amine groups and having an equivalent weight of up to 400 and which material is dispersed in said polyol composition; the amounts of b2) to b4) being calculated per 100 parts by weight of b1); and 5) optionally auxiliaries and additives known per se.

2. Process according to claim 1, wherein the weight ratio of homologues having 3 NCO-groups over homologues having 4 or more NCO-groups+by-products is less than 1.0.

3. Process according to claim 1 wherein the particulate material is the reaction product of triethanolamine and diphenylmethane diisocyanate optionally comprising homologues thereof having an isocyanate functionality of 3 or more.

4. Foams made according to claim 1.

5. Reaction system comprising the polyisocyanate and polyol composition described in claim 1.

6. Prepolymer or semi- or quasi-prepolymer composition having a free NCO content of 8–38% by weight, containing the polyisocyanate composition described in claim 1, part of said polyisocyanate composition being present in the form of a urethane containing adduct with the polyol b1) described in claim 1.

7. Prepolymer or semi- or quasi-prepolymer composition according to claim 6 the composition having a free NCO content of 12–26% by weight.

8. Prepolymer or semi- or quasi-prepolymer composition according to claim 6 wherein the amount of the adduct is 30–60% by weight of the composition.

* * * * *